US011446862B2

(12) United States Patent
Farah et al.

(10) Patent No.: US 11,446,862 B2
(45) Date of Patent: Sep. 20, 2022

(54) SACRIFICIAL LAYERS IN SELECTIVE DEPOSITION-BASED ADDITIVE MANUFACTURING OF PARTS

(71) Applicant: Evolve Additive Solutions, Inc., Minnetonka, MN (US)

(72) Inventors: Zeiter Farah, Minneapolis, MN (US); Andrew Rice, Chaska, MN (US)

(73) Assignee: Evolve Additive Solutions, Inc., Minnetonka, MN (US)

( * ) Notice: Subject to any disclaimer, the term of this patent is extended or adjusted under 35 U.S.C. 154(b) by 143 days.

(21) Appl. No.: 16/958,906

(22) PCT Filed: Dec. 28, 2018

(86) PCT No.: PCT/US2018/067901
§ 371 (c)(1),
(2) Date: Jun. 29, 2020

(87) PCT Pub. No.: WO2019/133835
PCT Pub. Date: Jul. 4, 2019

(65) Prior Publication Data
US 2020/0338814 A1  Oct. 29, 2020

Related U.S. Application Data

(60) Provisional application No. 62/612,087, filed on Dec. 29, 2017.

(51) Int. Cl.
*B29C 64/147* (2017.01)
*B33Y 10/00* (2015.01)
(Continued)

(52) U.S. Cl.
CPC .......... *B29C 64/147* (2017.08); *B29C 64/393* (2017.08); *B33Y 10/00* (2014.12);
(Continued)

(58) Field of Classification Search
CPC ... B29C 64/147; B29C 64/153; B29C 64/218; B29C 64/295; B29C 64/379;
(Continued)

(56) References Cited

U.S. PATENT DOCUMENTS 8,123,999 B2   2/2012  Priedeman et al.
8,246,888 B2   8/2012  Hopkins et al.
(Continued)

FOREIGN PATENT DOCUMENTS

EP   2922029     9/2015
JP   2017165065  9/2017
WO   2019133835  7/2019

OTHER PUBLICATIONS

"International Preliminary Reporton Patentability," for PCT Application No. PCT/US2018/067901 dated Jul. 9, 2020 (9 pages).
(Continued)

*Primary Examiner* — George R Koch
(74) *Attorney, Agent, or Firm* — Pauly, DeVries Smith & Deffner LLC

(57) ABSTRACT

A method of operating a selective deposition-based additive manufacturing system capable of building a three-dimensional (3D) part includes developing a first layer using at least one electrostatographic engine, conveying the first layer from the at least one EP engine to a transfusion assembly, determining an anticipated transfusion overlay error for the first layer, determining whether the anticipated transfusion overlay error exceeds an overlay error specification, discarding the first layer after determining that the anticipated transfusion overlay error exceeds the overlay error specification, developing a successive layer using the at least one electrostatographic engine, conveying the successive layer from the at least one electrostatographic engine to the transfusion assembly, and transfusing the successive
(Continued)

layer on a part build surface using the transfusion assembly to build the 3D part in a layer-by-layer manner on a part build platform.

18 Claims, 7 Drawing Sheets

(51) Int. Cl.
    *B33Y 50/02* (2015.01)
    *B29C 64/393* (2017.01)
    *G03G 15/22* (2006.01)
    *G03G 15/00* (2006.01)
    *B33Y 30/00* (2015.01)

(52) U.S. Cl.
    CPC ............ *B33Y 50/02* (2014.12); *G03G 15/224* (2013.01); *G03G 15/50* (2013.01); *B33Y 30/00* (2014.12)

(58) Field of Classification Search
    CPC ..... B29C 64/386; B29C 64/393; B29C 64/40; B33Y 10/00; B33Y 30/00; B33Y 50/02; G03G 15/224; G03G 15/50
    See application file for complete search history.

(56) References Cited

U.S. PATENT DOCUMENTS

| | | |
|---|---|---|
| 8,459,280 B2 | 6/2013 | Swanson et al. |
| 8,488,994 B2 | 7/2013 | Hanson et al. |
| 8,765,045 B2 | 7/2014 | Zinniel |
| 8,879,957 B2 | 11/2014 | Hanson et al. |
| 2011/0186081 A1 | 8/2011 | Dunn et al. |
| 2013/0186549 A1 | 7/2013 | Comb et al. |
| 2013/0186558 A1 | 7/2013 | Comb et al. |
| 2015/0269289 A1* | 9/2015 | Kim .................. G06F 30/20 703/6 |
| 2015/0273767 A1 | 10/2015 | Batchelder et al. |
| 2016/0339646 A1 | 11/2016 | Baecker et al. |
| 2017/0001381 A1 | 1/2017 | Suzuki et al. |

OTHER PUBLICATIONS

"International Search Report and Written Opinion," for PCT Application No. PCT/US2018/067901 dated Jun. 18, 2019(15 pages).

* cited by examiner

SACRIFICIAL LAYERS IN SELECTIVE DEPOSITION-BASED ADDITIVE MANUFACTURING OF PARTS

This application is a 371 of PCT/US2018/067901, filing date Dec. 28, 2018.

BACKGROUND

The present disclosure relates to additive manufacturing systems for producing three-dimensional (3D) parts and support structures. In particular, the present disclosure relates to electrophotography-based additive manufacturing systems for producing 3D parts, and methods of producing 3D parts using the systems.

Additive manufacturing systems are used to build 3D parts from digital representations of the 3D parts (e.g., AMF and STL format files) using one or more additive manufacturing techniques. Examples of additive manufacturing techniques include extrusion-based techniques, ink jetting, selective laser sintering, powder/binder jetting, electron-beam melting, stereolithographic, and electrophotographic processes. For each of these techniques, the digital representation of the 3D part is initially sliced into multiple horizontal layers. For each sliced layer, a tool path is then generated, which provides instructions for the particular additive manufacturing system to form the given layer.

In an electrophotographic 3D printing or production process, each slice of the digital representation of the 3D part is printed or developed using an electrophotographic engine. The electrophotographic engine generally operates in accordance with 2D electrophotographic printing processes, but with a polymeric toner. The electrophotographic engine typically uses a conductive support drum that is coated with a photoconductive material layer, where latent electrostatic images are formed by electrostatic charging, followed by image-wise exposure of the photoconductive layer by an optical source. The latent electrostatic images are then moved to a developing station where the polymeric toner is applied to charged areas, or alternatively to discharged areas of the photoconductive insulator to form the layer of the polymeric toner representing a slice of the 3D part. The developed layer is transferred to a transfer medium, from which successive layers are transfused to previously printed layers with heat and/or pressure to build the 3D part.

In addition to the aforementioned commercially available additive manufacturing techniques, a novel additive manufacturing technique has emerged, where particles are first selectively deposited in an imaging process, forming a layer corresponding to a slice of the part to be made; the layers are then bonded to each other, forming a part. This is a selective deposition process, in contrast to, for example, selective sintering, where the imaging and part formation happens simultaneously. The imaging step in a selective deposition process can be done using electrophotography. In two-dimensional (2D) printing, electrophotography (i.e., xerography) is a popular technology for creating 2D images on planar substrates, such as printing paper. Electrophotography systems include a conductive support drum coated with a photoconductive material layer, where latent electrostatic images are formed by charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

SUMMARY

In one aspect, the present disclosure is directed to a method of operating a selective deposition-based additive manufacturing system capable of building a three-dimensional (3D) part. The method can include developing a first layer using at least one electrostatography engine, conveying the first layer from the at least one EP engine to a transfusion assembly, determining an anticipated transfusion overlay error for the first layer, determining whether the anticipated transfusion overlay error exceeds an overlay error specification, discarding the first layer after determining that the anticipated transfusion overlay error exceeds the overlay error specification, developing a successive layer using the at least one electrostatography engine, conveying the successive layer from the at least one electrostatography engine to the transfusion assembly, and transfusing the successive layer on a part build surface using the transfusion assembly to build the 3D part in a layer-by-layer manner on a part build platform. The first layer and the successive layer can each be made of at least one of a part material and a support material.

In another aspect, a method of operating a selective deposition-based additive manufacturing system to build a 3D part includes analyzing a digital representation of the 3D part to identify at least one feature of the 3D part at or near a minimum feature size, developing a first layer using at least one EP engine, conveying the first layer from the at least one EP engine to a transfusion assembly, determining an anticipated transfusion overlay error for the first layer, determining whether the anticipated transfusion overlay error exceeds an overlay error specification, determining whether discarding the first layer, in combination with a non-adjoining window to reprint a subsequent layer, would cause the at least one feature of the 3D part at or near a minimum feature size to fall below the minimum feature size, retaining the first layer after determining that the anticipated transfusion overlay error exceeds the overlay error specification but would cause the at least one feature of the 3D part at or near a minimum feature size to fall below the minimum feature size, and transfusing the first layer on a part build surface using the transfusion assembly to build the 3D part in a layer-by-layer manner on a part build platform. The digital representation can include a plurality of slices corresponding to a plurality of layers of the 3D part, where the first layer is one of the plurality of layers. The first layer can be made of at least one of a part material and a support material.

In yet another aspect, a method of operating a selective deposition-based additive manufacturing system to build a 3D part in a layer-by-layer manner includes analyzing a digital representation of the 3D part to identify at least one feature of the 3D part at or near a minimum feature size, developing a first layer using at least one EP engine, conveying the first layer from the at least one EP engine to a transfusion assembly, determining an anticipated transfusion overlay error for the first layer, determining whether the anticipated transfusion overlay error exceeds an overlay error specification, ascertaining whether a non-adjoining window to reprint a subsequent layer exists, determining whether discarding the first layer, in combination with the non-adjoining window to reprint the subsequent layer, would cause the at least one feature of the 3D part at or near a minimum feature size to fall below the minimum feature size, and ceasing building of the 3D part when either (a) non-adjoining window to reprint a subsequent layer exists or (b) discarding the first layer would cause the at least one feature of the 3D part at or near a minimum feature size to fall below the minimum feature size. The digital representation includes a plurality of slices corresponding to a plurality of layers of the 3D part, and the first layer is one of the plurality of layers. The first layer comprises at least one of a part material and a support material. The non-adjoining window is separated from an intended position of the first layer in the 3D part by a predetermined number of intermediate layers that are each part of the plurality of layers.

The present summary is provided only by way of example, and not limitation. Other aspects of the present invention will be appreciated in view of the entirety of the present disclosure, including the entire text, claims and accompanying figures.

Definitions

Unless otherwise specified, the following terms as used herein have the meanings provided below:

The term "copolymer" refers to a polymer having two or more monomer species, and includes terpolymers (i.e., copolymers having three monomer species).

The terms "at least one" and "one or more of" an element are used interchangeably, and have the same meaning that includes a single element and a plurality of the elements, and may also be represented by the suffix "(s)" at the end of the element. For example, "at least one polyamide", "one or more polyamides", and "polyamide(s)" may be used interchangeably and have the same meaning.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

The term "selective deposition" refers to an additive manufacturing technique where one or more layers of particles are fused to previously deposited layers utilizing heat and pressure over time where the particles fuse together to form a layer of the part and also fuse to the previously printed layer.

The term "electrostatography" refers to the formation and utilization of latent electrostatic charge patterns to form an image of a layer of a part, a support structure or both on a surface. Electrostatography includes, but is not limited to, electrophotography where optical energy is used to form the latent image, ionography where ions are used to form the latent image and/or electron beam imaging where electrons are used to form the latent image.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

All references cited herein are incorporated by reference in their entireties.

Figure 1:
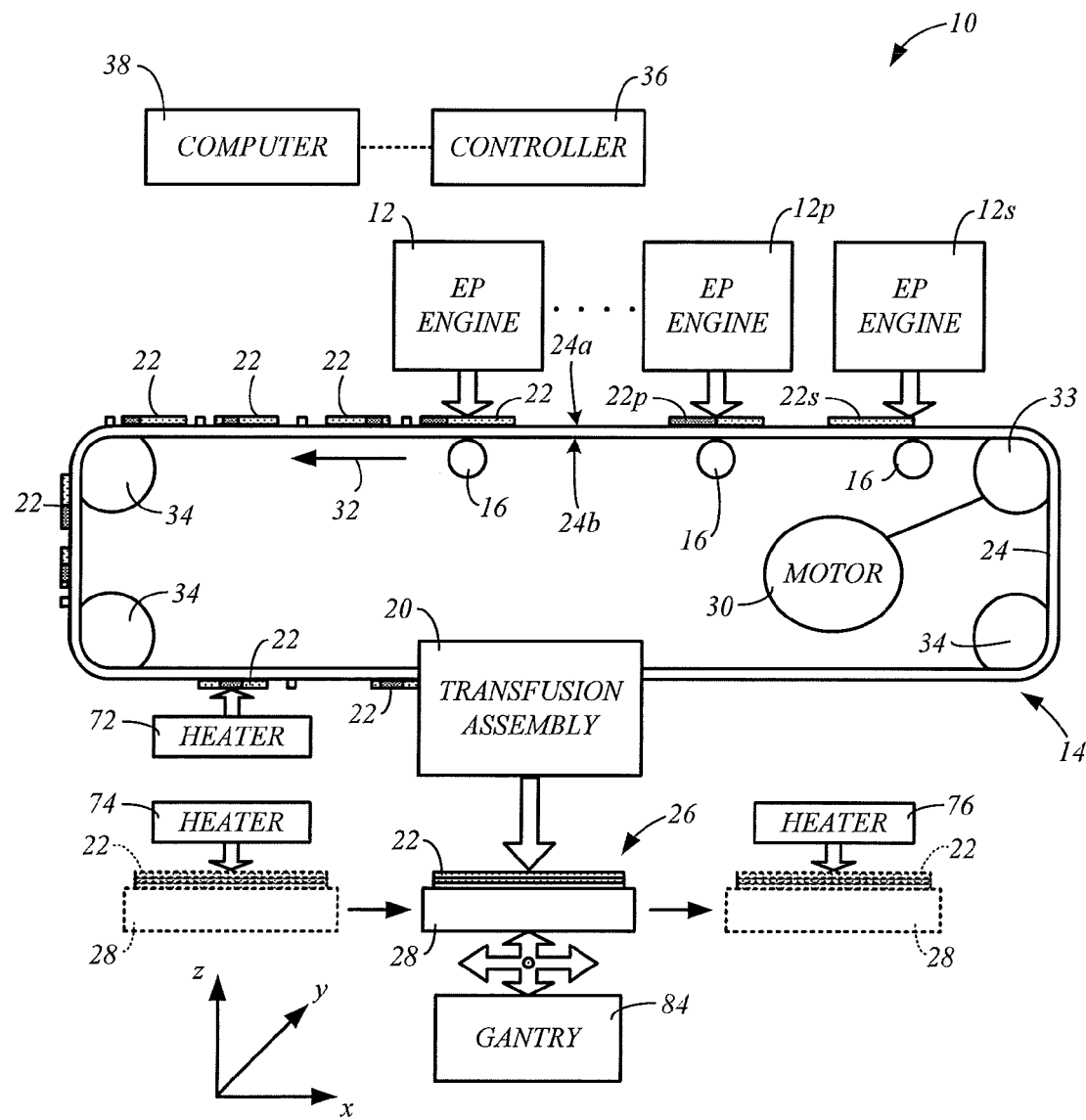
FIG. 1 is a simplified diagram of an example selective deposition-based additive manufacturing system for printing 3D parts and associated support structures, in accordance with embodiments of the present disclosure.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to selective deposition-based additive manufacturing systems for printing 3D parts, and methods of printing 3D parts using such systems. As mentioned above, during selective deposition additive manufacturing or printing operation of a 3D part, an electrostatography engine can develop each layer of the 3D part (and any associated support material) out of a polymeric toner or powder-based material using an electrostatographic process. The developed layers are then transferred to a transfer medium (e.g., a flexible belt), which conveys the layers to a transfusion assembly where those layers are transfused (e.g., using heat and/or pressure) to build a 3D part and support structures in a layer-by-layer manner.

The accuracy at which a 3D part may be produced using a selective deposition-based additive manufacturing system is limited by overlay errors at the transfusion assembly. Overlay errors relate to the accuracy at which a printed layer is transfused to a layer of the currently formed 3D part and support structure in proper alignment. Registration and overlay errors can prevent the part and support materials from being printed at precisely the correct locations or within a margin of error in an x-y build plane, which can reduce printing accuracies, particularly for fine-feature details. Additionally, in some situations, these errors can result in the formation of a surface "feather" defect and/or shelving offset defects, which can impact cosmetic appearances of finished parts or produce structural weaknesses. Shelving defects, particularly when unsupported, can also lead to peeling away of the shelved portion of a part during transfusion. Additionally, overlay errors can induce crack-like surface features and/or introduce fracture planes that can substantially reduce the effective bulk strength of the fabricated parts, either of which can potentially cause a part to fall apart during a support removal process, even in situations in which a part is immersed in a brick of support material. Overlays errors present a formidable challenge for part building. For instance, a transfer medium configured as a belt that supports layers for transfusion can wander more than half an inch (1.27 cm) per revolution, or by approximately 300 pixels (at 600 dots per inch resolution), due to belt temperature, stretch, tension changes, or other effects. Such wander may also be non-uniform, and may vary between different portions of each belt revolution.

Therefore, the present disclosure provides a system and method for dynamically assessing anticipated overlay errors while building a part, and allows for selective omission of one or more layers that would otherwise have an anticipated overlay error outside of an acceptable specification. Although not intuitive, overall part quality can be improved in some instances by deliberately skipping or omitting layers that are so errant that they cannot be completely corrected during transfusion, subject to allowed limits for time, acceleration, etc. Compensation for an omitted layer can be made, for instance, by reprinting a subsequent layer to make up for the loss of the omitted layer. Limits on layer omission can also be imposed, such as to avoid part features falling below a minimum size (e.g., below a minimum number of layers). Additional steps, features and benefits of the present disclosure are provided below.

While the present disclosure can be utilized with any selective deposition based additive manufacturing system, such as an electrostatography-based additive manufacturing system, the present disclosure will be described in association in an electrophotography-based (EP) additive manufacturing system. However, the present disclosure is not limited to an EP based additive manufacturing system and can be utilized with any electrostatography-based additive manufacturing system.

FIG. 1 is a simplified diagram of an example electrophotography-based additive manufacturing system 10 for printing 3D parts and associated support structures, in accordance with embodiments of the present disclosure. As shown in FIG. 1, system 10 includes one or more EP engines, generally referred to as 12, such as EP engines 12$p$ and 12$s$, a transfer assembly 14, biasing mechanisms 16, and a transfusion assembly 20. Examples of suitable components and functional operations for system 10 include those disclosed in Hanson et al., U.S. Pat. Nos. 8,879,957 and 8,488,994, and in Comb et al., U.S. Patent Publication Nos. 2013/0186549 and 2013/0186558.

The EP engines 12$p$ and 12$s$ are imaging engines for respectively imaging or otherwise developing layers, generally referred to as 22, of the powder-based part and support materials, where the part and support materials are each preferably engineered for use with the particular architecture of the EP engine 12$p$ or 12$s$. As discussed below, the developed layers 22 are transferred to a transfer medium 24 of the transfer assembly 14, which delivers the layers 22 to the transfusion assembly 20. The transfusion assembly 20 operates to build the 3D part 26, which may include support structures and other features, in a layer-by-layer manner by transfusing the layers 22 together on a build platform 28.

In some embodiments, the transfer medium 24 includes a belt, as shown in FIG. 1. Examples of suitable transfer belts for the transfer medium 24 include those disclosed in Comb et al., U.S. Patent Application Publication Nos. 2013/0186549 and 2013/0186558. In some embodiments, the belt 24 includes front surface 24$a$ and rear surface 24$b$, where front surface 24$a$ faces the EP engines 12, and the rear surface 24$b$ is in contact with the biasing mechanisms 16.

In some embodiments, the transfer assembly 14 includes one or more drive mechanisms that include, for example, a motor 30 and a drive roller 33, or other suitable drive mechanism, and operate to drive the transfer medium or belt 24 in a feed direction 32. In some embodiments, the transfer assembly 14 includes idler rollers 34 that provide support for the belt 24. The example transfer assembly 14 illustrated in FIG. 1 is highly simplified and may take on other configurations. Additionally, the transfer assembly 14 may include additional components that are not shown in order to simplify the illustration, such as, for example, components for maintaining a desired tension in the belt 24, a belt cleaner for removing debris from the surface 24$a$ that receives the layers 22, and other components.

The EP engine 12$s$ develops layers of powder-based support material, and the EP engine 12$p$ develops layers of powder-based part/build material. In some embodiments, the EP engine 12$s$ is positioned upstream from the EP engine 12$p$ relative to the feed direction 32, as shown in FIG. 1. In alternative embodiments, the arrangement of the EP engines 12$p$ and 12$s$ may be reversed such that the EP engine 12$p$ is upstream from the EP engine 12$s$ relative to the feed direction 32. In further alternative embodiments, system 10 may include three or more EP engines 12 for printing layers of additional materials, as indicated in FIG. 1.

System 10 also includes controller 36, which represents one or more processors that are configured to execute instructions, which may be stored locally in memory of the system 10 or in memory that is remote to the system 10, to control components of the system 10 to perform one or more functions described herein. In some embodiments, the controller 36 includes one or more control circuits, microprocessor-based engine control systems, and/or digitally-controlled raster imaging processor systems, and is configured to operate the components of system 10 in a synchronized manner based on printing instructions received from a host computer 38 or a remote location. In some embodiments, the host computer 38 includes one or more computer-based systems that are configured to communicate with controller 36 to provide the print instructions (and other operating information). For example, the host computer 38 may transfer information to the controller 36 that relates to the sliced layers of the 3D parts and support structures, thereby allowing the system 10 to print the 3D parts 26 and support structures in a layer-by-layer manner.

The components of system 10 may be retained by one or more frame structures (not shown for simplicity). Additionally, the components of system 10 may be retained within an enclosable housing (not shown for simplicity) that prevents components of the system 10 from being exposed to ambient light during operation.

Figure 2:
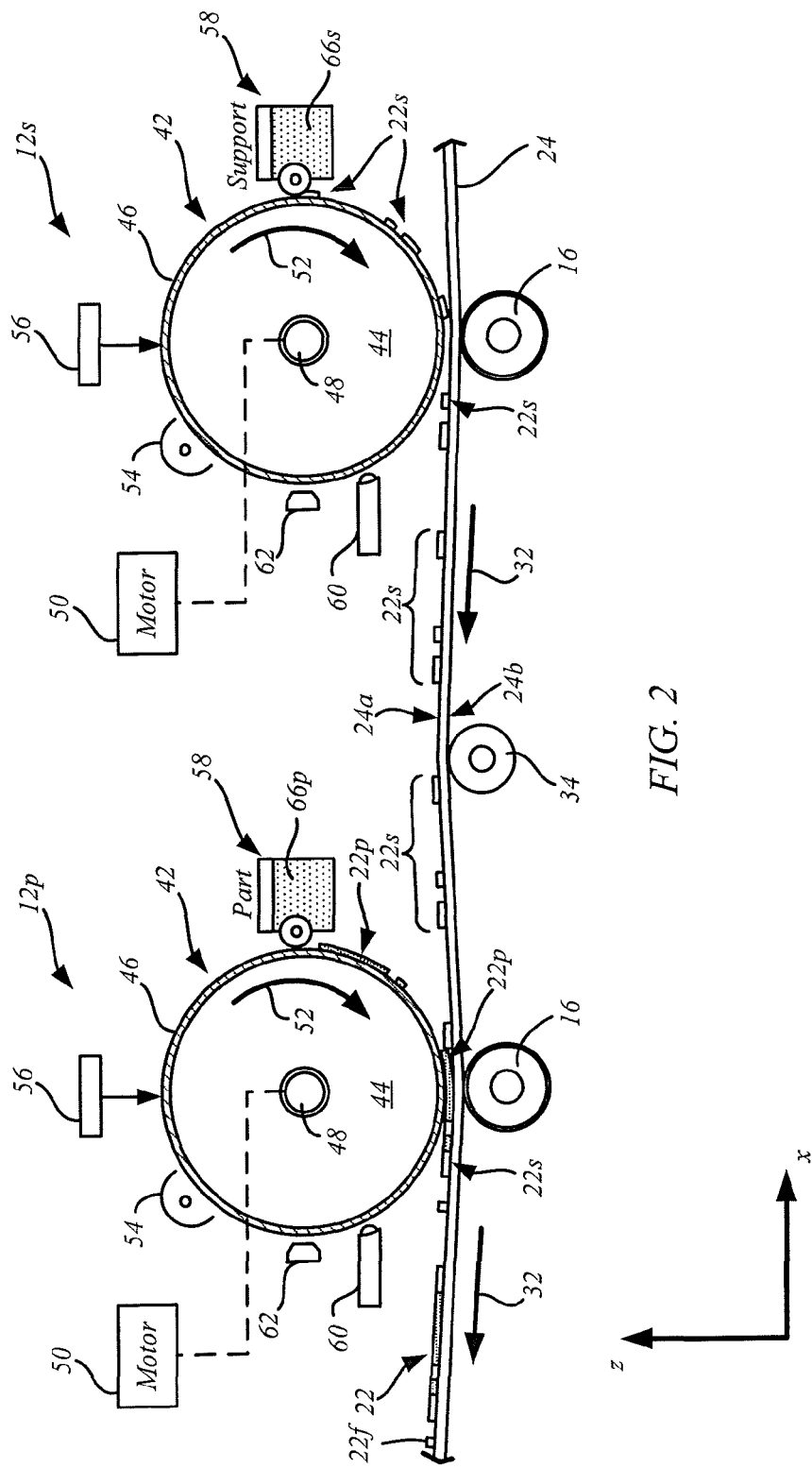
FIG. 2 is a schematic front view of a pair of example electrophotography (EP) engines of the system for developing layers of the part and support materials.

FIG. 2 is a schematic front view of the EP engines 12s and 12p of the system 10, in accordance with example embodiments of the present disclosure. In the illustrated embodiment, the EP engines 12p and 12s may include the same components, such as a photoconductor drum 42 having a conductive drum body 44 and a photoconductive surface 46. The conductive drum body 44 is an electrically-conductive drum (e.g., fabricated from copper, aluminum, tin, or the like) that is electrically grounded and configured to rotate around a shaft 48. The shaft 48 is correspondingly connected to a drive motor 50, which is configured to rotate the shaft 48 (and the photoconductor drum 42) in the direction of arrow 52 at a constant rate.

The photoconductive surface 46 is a thin film extending around the circumferential surface of the conductive drum body 44, and is preferably derived from one or more photoconductive materials, such as amorphous silicon, selenium, zinc oxide, organic materials, and the like. As discussed below, the surface 46 is configured to receive latent-charged images of the sliced layers of a 3D part or support structure (or negative images), and to attract charged particles of the part or support material to the charged or discharged image areas, thereby creating the layers of the 3D part or support structure.

As further shown, each of the example EP engines 12p and 12s also includes a charge inducer 54, an imager 56, a development station 58, a cleaning station 60, and a discharge device 62, each of which may be in signal communication with the controller 36. The charge inducer 54, the imager 56, the development station 58, the cleaning station 60, and the discharge device 62 accordingly define an image-forming assembly for the surface 46 while the drive motor 50 and the shaft 48 rotate the photoconductor drum 42 in the direction 52.

Each of the EP engines 12 uses the powder-based material (e.g., polymeric or thermoplastic toner), generally referred to herein by reference character 66, to develop or form the layers 22. In some embodiments, the image-forming assembly for the surface 46 of the EP engine 12s is used to form support layers 22s of powder-based support material 66s, where a supply of the support material 66s may be retained by the development station 58 (of the EP engine 12s) along with carrier particles. Similarly, the image-forming assembly for the surface 46 of the EP engine 12p is used to form part layers 22p of powder-based part material 66p, where a supply of the part material 66p may be retained by the development station 58 (of the EP engine 12p) along with carrier particles.

The charge inducer 54 is configured to generate a uniform electrostatic charge on the surface 46 as the surface 46 rotates in the direction 52 past the charge inducer 54. Suitable devices for the charge inducer 54 include corotrons, scorotrons, charging rollers, and other electrostatic charging devices.

Each imager 56 is a digitally-controlled, pixel-wise light exposure apparatus configured to selectively emit electromagnetic radiation toward the uniform electrostatic charge on the surface 46 as the surface 46 rotates in the direction 52 the past imager 56. The selective exposure of the electromagnetic radiation to the surface 46 is directed by the controller 36, and causes discrete pixel-wise locations of the electrostatic charge to be removed (i.e., discharged to ground), thereby forming latent image charge patterns on the surface 46.

Suitable devices for the imager 56 include scanning laser (e.g., gas or solid-state lasers) light sources, light emitting diode (LED) array exposure devices, and other exposure device conventionally used in 2D electrophotography systems. In alternative embodiments, suitable devices for the charge inducer 54 and the imager 56 include ion-deposition systems configured to selectively directly deposit charged ions or electrons to the surface 46 to form the latent image charge pattern.

Each development station 58 is an electrostatic and magnetic development station or cartridge that retains the supply of the part material 66p or the support material 66s, along with carrier particles. The development stations 58 may function in a similar manner to single or dual component development systems and toner cartridges used in 2D electrophotography systems. For example, each development station 58 may include an enclosure for retaining the part material 66p or the support material 66s and carrier particles. When agitated, the carrier particles generate triboelectric charges to attract the powders of the part material 66p or the support material 66s, which charges the attracted powders to a desired sign and magnitude, as discussed below.

Each development station 58 may also include one or more devices for transferring the charged part or the support material 66p or 66s to the surface 46, such as conveyors, fur brushes, paddle wheels, rollers, and/or magnetic brushes. For instance, as the surface 46 (containing the latent charged image) rotates from the imager 56 to the development station 58 in the direction 52, the charged part material 66p or the support material 66s is attracted to the appropriately charged regions of the latent image on the surface 46, utilizing either charged area development or discharged area development (depending on the electrophotography mode being utilized). This creates successive layers 22p or 22s as the photoconductor drum 12 continues to rotate in the direction 52, where the successive layers 22p or 22s correspond to the successive sliced layers of the digital representation of the 3D part or support structure.

The successive layers 22p or 22s are then rotated with the surface 46 in the direction 52 to a transfer region in which layers 22p or 22s are successively transferred from the photoconductor drum 42 to the belt 24 or other transfer medium, as discussed below. While illustrated as a direct engagement between the photoconductor drum 42 and the belt 24, in some preferred embodiments, the EP engines 12p and 12s may also include intermediary transfer drums and/or belts, as discussed further below.

After a given layer 22p or 22s is transferred from the photoconductor drum 42 to the belt 24 (or an intermediary transfer drum or belt), the drive motor 50 and the shaft 48 continue to rotate the photoconductor drum 42 in the direction 52 such that the region of the surface 46 that previously held the layer 22p or 22s passes the cleaning station 60. The cleaning station 60 is a station configured to remove any residual, non-transferred portions of part or support material 66p or 66s. Suitable devices for the cleaning station 60 include blade cleaners, brush cleaners, electrostatic cleaners, vacuum-based cleaners, and combinations thereof.

After passing the cleaning station 60, the surface 46 continues to rotate in the direction 52 such that the cleaned regions of the surface 46 pass the discharge device 62 to remove any residual electrostatic charge on the surface 46, prior to starting the next cycle. Suitable devices for the discharge device 62 include optical systems, high-voltage alternating-current corotrons and/or scorotrons, one or more rotating dielectric rollers having conductive cores with applied high-voltage alternating-current, and combinations thereof.

The biasing mechanisms 16 are configured to induce electrical potentials through the belt 24 to electrostatically attract the layers 22p and 22s from the EP engines 12p and 12s to the belt 24. Because the layers 22p and 22s are each only a single layer increment in thickness at this point in the process, electrostatic attraction is suitable for transferring the layers 22p and 22s from the EP engines 12p and 12s to the belt 24.

The controller 36 preferably rotates the photoconductor drums 42 of the EP engines 12p and 12s at the same rotational rates that are synchronized with the line speed of the belt 24 and/or with any intermediary transfer drums or belts. This allows the system 10 to develop and transfer the layers 22p and 22s in coordination with each other from separate developer images. In particular, as shown, each part layer 22p may be transferred to the belt 24 with proper registration with each support layer 22s to produce a combined part and support material layer, which is generally designated as layer 22. As can be appreciated, some of the layers 22 transferred to the layer transfusion assembly 20 may only include support material 66s or may only include part material 66p, depending on the particular support structure and 3D part geometries and layer slicing.

In an alternative embodiment, the part layers 22p and the support layers 22s may optionally be developed and transferred along the belt 24 separately, such as with alternating layers 22p and 22s. These successive, alternating layers 22p and 22s may then be transferred to layer transfusion assembly 20, where they may be transfused separately to print or build the 3D part 26 and support structure.

Figure 3:
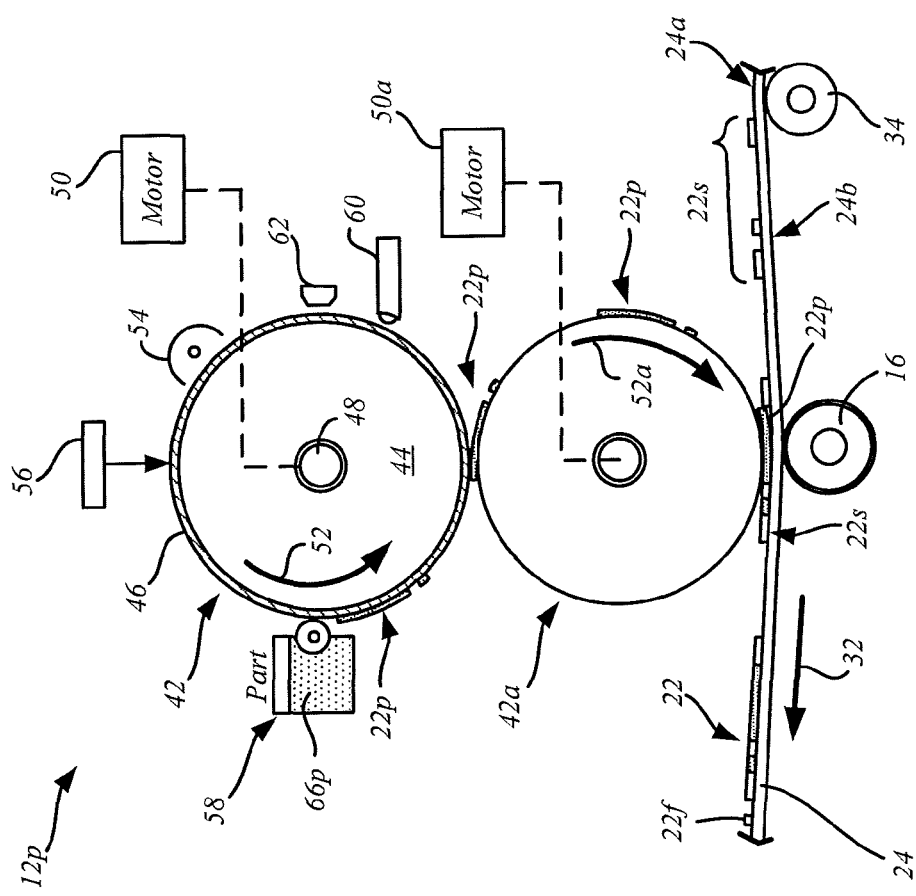
FIG. 3 is a schematic front view of an example electrophotography engine, which includes an intermediary drum or belt.

In a further alternative embodiment, one or both of the EP engines 12p and 12s may also include one or more intermediary transfer drums and/or belts between the photoconductor drum 42 and the belt or transfer medium 24. For example, as shown in FIG. 3, the EP engine 12p may also include an intermediary drum 42a that rotates in the direction 52a that opposes the direction 52, in which drum 42 is rotated, under the rotational power of motor 50a. The intermediary drum 42a engages with the photoconductor drum 42 to receive the developed layers 22p from the photoconductor drum 42, and then carries the received developed layers 22p and transfers them to the belt 24.

The EP engine 12s may include the same arrangement of an intermediary drum 42a for carrying the developed layers 22s from the photoconductor drum 42 to the belt 24. The use of such intermediary transfer drums or belts for the EP engines 12p and 12s can be beneficial for thermally isolating the photoconductor drum 42 from the belt 24, if desired.

Figure 4:
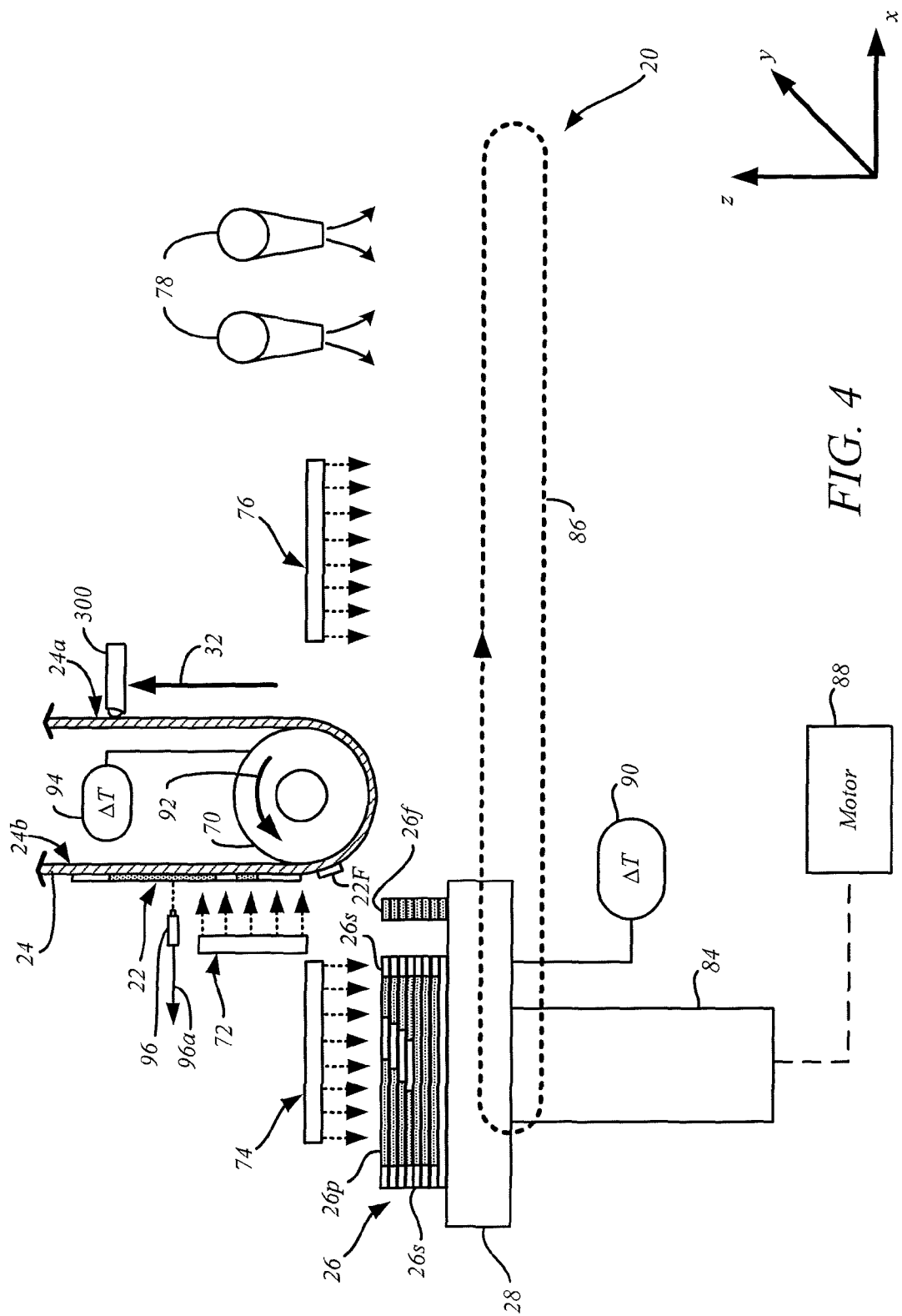
FIG. 4 is a schematic front view of an example transfusion assembly of the system for performing layer transfusion steps with the developed layers.

FIG. 4 illustrates an embodiment of the layer transfusion assembly 20. As shown, the transfusion assembly 20 includes the build platform 28, a nip roller 70, pre-transfusion heaters 72 and 74, an optional post-transfusion heater 76, and air jets 78 (or other cooling units). The build platform 28 is a platform assembly or platen of system 10 that is configured to receive the heated combined layers 22 (or separate layers 22p and 22s) for printing the part 26, which includes a 3D part 26p formed of the part layers 22p, and support structure 26s formed of the support layers 22s, in a layer-by-layer manner. In some embodiments, the build platform 28 may include removable film substrates (not shown) for receiving the printed layers 22, where the removable film substrates may be restrained against build platform using any suitable technique (e.g., vacuum drawing).

The build platform 28 is supported by a gantry 84 or other suitable mechanism, which can be configured to move the build platform 28 along the z-axis and the x-axis (and, optionally, also the y-axis), as illustrated schematically in FIG. 1 (the y-axis being into and out of the page in FIG. 1, with the z-, x- and y-axes being mutually orthogonal, following the right-hand rule). The gantry 84 may produce cyclical movement patterns relative to the nip roller 70 and other components, as illustrated by broken line 86 in FIG. 4. The particular movement pattern of the gantry 84 can follow essentially any desired path suitable for a given application. The gantry 84 may be operated by a motor 88 based on commands from the controller 36, where the motor 88 may be an electrical motor, a hydraulic system, a pneumatic system, or the like. In one embodiment, the gantry 84 can included an integrated mechanism that precisely controls movement of the build platform 28 in the z- and x-axis directions (and optionally the y-axis direction). In alternate embodiments, the gantry 84 can include multiple, operatively-coupled mechanisms that each control movement of the build platform 28 in one or more directions, for instance, with a first mechanism that produces movement along both the z-axis and the x-axis and a second mechanism that produces movement along only the y-axis. The use of multiple mechanisms can allow the gantry 84 to have different movement resolution along different axes. Moreover, the use of multiple mechanisms can allow an additional mechanism to be added to an existing mechanism operable along fewer than three axes.

In the illustrated embodiment, the build platform 28 is heatable with heating element 90 (e.g., an electric heater). The heating element 90 is configured to heat and maintain the build platform 28 at an elevated temperature that is greater than room temperature (25° C.), such as at a desired average part temperature of 3D part 26p and/or support structure 26s, as discussed in Comb et al., U.S. Patent Application Publication Nos. 2013/0186549 and 2013/0186558. This allows the build platform 28 to assist in maintaining 3D part 26p and/or support structure 26s at this average part temperature.

The nip roller 70 is an example heatable element or heatable layer transfusion element, which is configured to rotate around a fixed axis with the movement of the belt 24. In particular, the nip roller 70 may roll against the rear surface 22s in the direction of arrow 92 while the belt 24 rotates in the feed direction 32. In the shown embodiment, the nip roller 70 is heatable with a heating element 94 (e.g., an electric heater). The heating element 94 is configured to heat and maintain nip roller 70 at an elevated temperature that is greater than room temperature (25° C.), such as at a desired transfer temperature for the layers 22.

The pre-transfusion heater 72 includes one or more heating devices (e.g., an infrared heater and/or a heated air jet) that are configured to heat the layers 22 on the belt 24 to a temperature near an intended transfer temperature of the layer 22, such as at least a fusion temperature of the part material 66p and the support material 66s, prior to reaching nip roller 70. Each layer 22 desirably passes by (or through) the heater 72 for a sufficient residence time to heat the layer 22 to the intended transfer temperature. The pre-transfusion heater 74 may function in the same manner as the heater 72, and heats the top surfaces of the 3D part 26p and support structure 26s on the build platform 28 to an elevated temperature, such as at the same transfer temperature as the heated layers 22 (or other suitable elevated temperature).

As mentioned above, the support material 66s of the present disclosure used to form the support layers 22s and the support structure 26s, preferably has a melt rheology that is similar to or substantially the same as the melt rheology of the part material 66p of the present disclosure used to form the part layers 22p and the 3D part 26p. This allows the part and support materials 66p and 66s of the layers 22p and 22s to be heated together with the heater 72 to substantially the same transfer temperature, and also allows the part and support materials 66p and 66s at the top surfaces of the 3D part 26p and support structure 26s to be heated together with heater 74 to substantially the same temperature. Thus, the part layers 22p and the support layers 22s may be transfused together to the top surfaces of the 3D part 26p and the support structure 26s in a single transfusion step as the combined layer 22.

Optional post-transfusion heater 76 is located downstream from nip roller 70 and upstream from air jets 78, and is configured to heat the transfused layers 22 to an elevated temperature. Again, the close melt rheologies of the part and support materials 66p and 66s allow the post-transfusion heater 76 to post-heat the top surfaces of 3D part 26p and support structure 26s together in a single post-fuse step.

As mentioned above, in some embodiments, prior to building the part 26 on the build platform 28, the build platform 28 and the nip roller 70 may be heated to their desired temperatures. For example, the build platform 28 may be heated to the average part temperature of 3D part 26p and support structure 26s (due to the close melt rheologies of the part and support materials). In comparison, the nip roller 70 may be heated to a desired transfer temperature for the layers 22 (also due to the close melt rheologies of the part and support materials).

During the printing or transferring operation, the belt 24 carries a layer 22 past the heater 72, which may heat the layer 22 and the associated region of the belt 24 to the transfer temperature. Suitable transfer temperatures for the part and support materials 66p and 66s of the present disclosure include temperatures that exceed the glass transition temperature of the part and support materials 66p and 66s, where the layer 22 is softened but not melted.

As further shown in FIG. 4, during operation, the gantry 84 may move the build platform 28 (with 3D part 26p and support structure 26s) in a reciprocating pattern 86. In particular, the gantry 84 may move the build platform 28 along the x-axis below, along, or through the heater 74. The heater 74 heats the top surfaces of 3D part 26p and support structure 26s to an elevated temperature, such as the transfer temperatures of the part and support materials. As discussed in Comb et al., U.S. Patent Application Publication Nos. 2013/0186549 and 2013/0186558, the heaters 72 and 74 may heat the layers 22 and the top surfaces of 3D part 26p and support structure 26s to about the same temperatures to provide a consistent transfusion interface temperature. Alternatively, the heaters 72 and 74 may heat layers 22 and the top surfaces of 3D part 26p and support structure 26s to different temperatures to attain a desired transfusion interface temperature.

The continued rotation of the belt 24 and the movement of the build platform 28 align the heated layer 22 with the heated top surfaces of 3D part 26p and support structure 26s with proper registration along the x-axis. The gantry 84 may continue to move the build platform 28 along the x-axis, at a rate that is synchronized with the rotational rate of the belt 24 in the feed direction 32 (i.e., the same directions and speed). This causes the rear surface 24b of the belt 24 to rotate around the nip roller 70 to nip the belt 24 and the heated layer 22 against the top surfaces of 3D part 26p and support structure 26s. This presses the heated layer 22 between the heated top surfaces of 3D part 26p and support structure 26s at the location of the nip roller 70, which at least partially transfuses the heated layer 22 to the top layers of 3D part 26p and support structure 26s.

As the transfused layer 22 passes the nip of the nip roller 70, the belt 24 wraps around the nip roller 70 to separate and disengage from the build platform 28. This assists in releasing the transfused layer 22 from the belt 24, allowing the transfused layer 22 to remain adhered to 3D part 26p and support structure 26s. Maintaining the transfusion interface temperature at a transfer temperature that is higher than its glass transition temperature, but lower than its fusion temperature, allows the heated layer 22 to be hot enough to adhere to the 3D part 26p and support structure 26s, while also being cool enough to readily release from the belt 24. Additionally, as discussed above, the close melt rheologies of the part and support materials allow them to be transfused in the same step.

After release, the gantry 84 continues to move the build platform 28 along the x-axis to the post-transfusion heater 76. At post-transfusion heater 76, the top-most layers of 3D part 26p and the support structure 26s (including the transfused layer 22) may then be heated to at least the fusion temperature of the thermoplastic-based powder in a post-fuse or heat-setting step. This melts the material of the transfused layer 22 to a highly fusable state such that polymer molecules of the transfused layer 22 quickly interdiffuse to achieve a high level of interfacial entanglement with 3D part 26p and support structure 26s.

Additionally, as the gantry 84 continues to move the build platform 28 along the x-axis past the post-transfusion heater 76 to the air jets 78, the air jets 78 blow cooling air towards the top layers of 3D part 26p and support structure 26s. This actively cools the transfused layer 22 down to the average part temperature, as discussed in Comb et al., U.S. Patent Application Publication Nos. 2013/0186549 and 2013/0186558.

To assist in keeping the 3D part 26p and support structure 26s at the average part temperature, in some preferred embodiments, the heater 74 and/or the heater 76 may operate to heat only the top-most layers of 3D part 26p and support structure 26s. For example, in embodiments in which heaters 72, 74, and 76 are configured to emit infrared radiation, the 3D part 26p and support structure 26s may include heat absorbers and/or other colorants configured to restrict penetration of the infrared wavelengths to within the top-most layers. Alternatively, the heaters 72, 74, and 76 may be configured to blow heated air across the top surfaces of 3D part 26p and support structure 26s. In either case, limiting the thermal penetration into 3D part 26p and support structure 26s allows the top-most layers to be sufficiently transfused, while also reducing the amount of cooling required to keep 3D part 26p and support structure 26s at the average part temperature.

The gantry 84 may then actuate the build platform 28 downward, and move the build platform 28 back along the x-axis to a starting position along the x-axis, following the reciprocating rectangular pattern 86. The build platform 28 desirably reaches the starting position for proper registration with the next layer 22. In some embodiments, the gantry 84 may also actuate the build platform 28 and 3D part 26p/support structure 26s upward for proper registration with the next layer 22. The same process may then be repeated for each remaining layer 22 of 3D part 26p and support structure 26s.

After the transfusion operation is completed, the resulting 3D part 26p and support structure 26s may be removed from system 10 and undergo one or more post-printing operations. For example, support structure 26s may be sacrificially removed from 3D part 26p using an aqueous-based solution, such as an aqueous alkali solution. Under this technique, support structure 26s may at least partially dissolve in the solution, separating it from 3D part 26p in a hands-free manner.

In comparison, part materials are chemically resistant to aqueous alkali solutions. This allows the use of an aqueous alkali solution to be employed for removing the sacrificial support structure 26s without degrading the shape or quality of 3D part 26p. Examples of suitable systems and techniques for removing support structure 26s in this manner include those disclosed in Swanson et al., U.S. Pat. No. 8,459,280; Hopkins et al., U.S. Pat. No. 8,246,888; and Dunn et al., U.S. Patent Application Publication No. 2011/0186081; each of which are incorporated by reference to the extent that they do not conflict with the present disclosure.

Furthermore, after support structure 26s is removed, 3D part 26p may undergo one or more additional post-printing processes, such as surface treatment processes. Examples of suitable surface treatment processes include those disclosed in Priedeman et al., U.S. Pat. No. 8,123,999; and in Zinniel, U.S. Pat. No. 8,765,045.

In some embodiments, one or more of the layers 22 formed using the EP engines 12 includes a fiducial portion 22f, as shown in FIG. 4, formed by one of the EP engines 12 (e.g., EP engine 12p). The fiducial portion 22f of each layer 22 forms a fiducial structure 26f associated with the 3D part 26 on the build platform 28 using the transfusion assembly 20. Fiducial portion 22f can be located at a leading edge of layer 22, that is, forward of other portions (e.g., 22p and 22s) of layer 22 on transfer medium 24. Fiducial portion 22f is shown in the illustrated embodiment as being spaced from other portions of layer 22, but can be contiguous with other portions of layer 22 in alternate embodiments. It may be preferable in some embodiments for a gap that spaced fiducial portion 22f from other portions of layer 22 to be relatively small, so that factors that may cause undesired positional drift of layer 22 and/or transfer medium 24 have less opportunity to deviate between the leading edge of fiducial portion 22f and the leading edge(s) of other portions (e.g., 22p and 22s). During operation of transfusion assembly 20, in one embodiment, the layer 22 including fiducial portion 22f is carried by the belt 24 past the heater 72, which may heat layer 22 to the desired elevated temperature. The layer 22 is then transfused to a build surface of the structure 26 on build platform 28, such that the part and support portions 22p and 22s are transfused to corresponding portions of 3D part 26, such as those corresponding to part 26p and support structure 26s, and the fiducial portion 22f is transfused to a build surface of the fiducial structure 26f. The belt 24 is then disengaged from transferred layer 22.

In some embodiments, the transfusion assembly 20 includes the one or more sensors, such as non-contacting (e.g., optical) sensor 96 (FIG. 4) that can be used to detect an anticipated arrival and/or a position of the layers 22, or portions thereof, on transfer medium belt 24 prior to arrival at nip roller 70 and the layer transfusion steps. For instance, sensor 96 can be used to detect an anticipated fiducial arrival event corresponding to the arrival of fiducial portion 22f, or at least a leading edge thereof. Outputs or output signals 96a from sensor 96 can be sent to controller 36 or other suitable control circuitry, and can indicate the anticipated detected positions of layers 22. In some embodiments, output signal(s) 96a can represent temporal data (e.g., arrival time of the leading edge of fiducial portion 22f at sensor 96) used together with velocity/acceleration data regarding transfer medium 24 to calculate an anticipated position data, such as an expected position of layer 22 (or portions thereof) upon arrive at nip roller 70. Such temporal and/or position data can be used, for example, to implement corrective or compensatory measures prior to transfusion of layer 22 at nip roller 70. The location of sensor 96 can vary as desired for particular applications. In the illustrated embodiment of FIG. 4, sensor 96 is located before heater 72, but, for instance, could be located after heater 72 in alternative embodiments.

Figure 5:
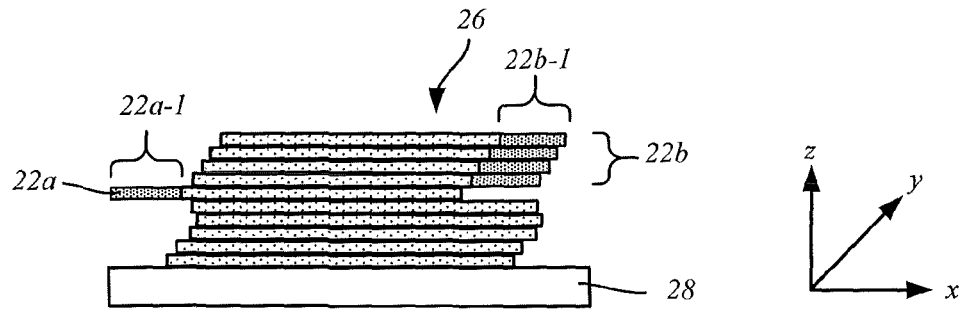
FIG. 5 is a schematic side view of an example 3D part with overlay errors.

FIG. 5 is a schematic side view of an example 3D part 26 having overlay errors supported on build platform 28. The illustrated overlay errors represent examples that can be found in parts built according to prior art processes. As shown in FIG. 5, layer 22a has an overlay error in substantially the x-axis (or in-track) direction that causes a region 22a-1 (shown with heavier stippling) to protrude from 3D part 26 and results in an exterior part surface "feather" defect on a single layer thick, which can also be considered an unsupported shelf. Moreover, as shown in FIG. 5, a set of four layers 22b has an overlay error in substantially the x-axis (or in-track) direction that causes a region 22b-1 (shown with heavier stippling) to protrude from 3D part 26 and results in an unsupported shelf. These defects are merely examples of the types of defects that can results from overlay errors, which can vary depending on part configuration. For instance, another type of defect (not shown) is a void formed along a build surface of a 3D part, which can lead to large area offsetting failure of the part, that is, lack of transfer of a layer as intended during transfusion. Moreover, while FIG. 5 shows x-axis overlay errors, y-axis and combined x- and y-axis overlay errors can occur.

Under intended build conditions, and absent significant overlay errors, unsupported shelves tend to have a perimeter that varies in x-y location from a preceding layer by a distance of a single layer thickness or less. Overlay errors can produce unsupported shelves that deviate from preceding layers by more than the thickness of a single layer. Intended part configurations with larger shelves (i.e., shelves with layer-to-layer perimeter variations larger than approximately the thickness of a single layer) can utilize support structures (i.e., made from support material 66s), but unintended shelves caused by overlay errors may lack the support structure that could otherwise be provided. Regions 22a-1 and/or 22b-1 can diminish the aesthetic appearance of 3D part 26, can be relatively weak and prone to cracking, and may lead to undesirable peeling of at least layer 22a from preceding layers 22 during transfusion operations.

It is therefore desirable to reduce overlay errors. Therefore, according to embodiments of the present disclosure, an anticipated overlay error for a given layer can be determined just before transfusion, and one or more layers with certain anticipated overlay errors can be discarded (i.e., sacrificed) and therefore omitted from 3D part 26. In this way, overlay errors substantially in the x-y plane can be reduced. As discussed below, variations in height of 3D part 26 caused by omitting one or more layers may be acceptable, or at least less problematic than x-y plane overlay errors, and height (z-axis) variations can also be compensated for during building of 3D part 26, in some circumstances.

Figure 6:
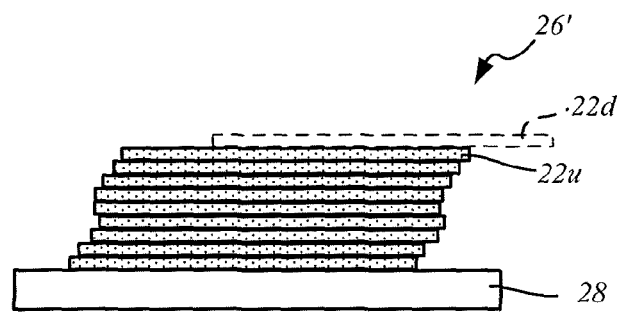
FIG. 6 is a schematic side view of another example 3D part with a layer omitted.

FIG. 6 is a schematic side view of another example 3D part 26' with a layer 26d omitted. In the illustrated embodiment, a layer 22d was discarded prior to transfusion upon layer 22u, resulting in layer 22d (shown in phantom) being omitted from 3D part 26'. Omission of layer 22d means that a total 3D part 26' is shorter than if a layer were transfused for each and every slice of a digital representation of 3D part 26'. Layer 22u becomes the uppermost layer of 3D part 26' rather than 22d.

Figure 7:
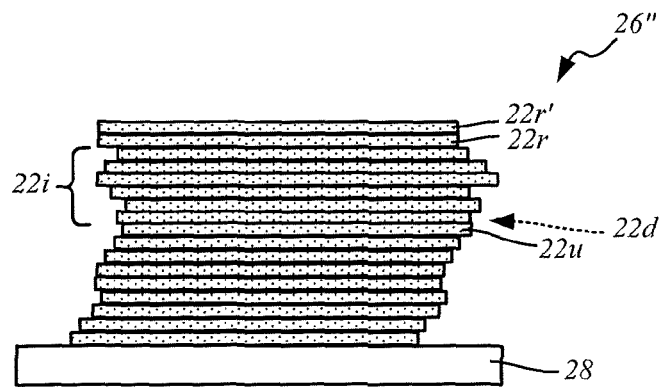
FIG. 7 is a schematic side view of yet another example 3D part with a reprinted layer to compensate for an omitted layer.

FIG. 7 is a schematic side view of yet another example 3D part 26" with a reprinted layer 22r to compensate for an omitted layer (an intended location of which is shown by arrow 22d). Much as with 3D part 26' of FIG. 6, the omitted layer was discarded prior to transfusion upon layer 22u. However, as shown in FIG. 7, building continues and additional layers are transfused on top of layer 22u. A plurality of intermediate layers 22i (e.g., six) are transfused on top of layer 22u, followed by a subsequent layer 22r that is then reprinted (at least once) as layer 22r'. In this context, "reprinted" means that a single slice of a digital representation of 3D part 26" is developed and transfused more than once. Rather than each slice of the digital representation uniquely corresponding to a given transfused layer in 3D part 26", two (or more) layers of 3D art 26" are developed and transfused based on a single given slice of the digital representation. In this respect, 3D part 26" has, contrary to the original digital representation, two layers 22r and 22r' that are substantially identical in x-y planes, both in terms of shape and positioning, but are at different (e.g., adjoining) z-axis positions, and lacks the omitted layer (as indicated by arrow 22d) that was specified by a slice of the original digital representation. In the illustrated embodiment, the subsequent layer 22r and the corresponding reprinted layer 22r' adjoin each other, with reprinted layer 22r' transfused directly on layer 22r, although in alternative embodiments one or more spacer layers could be present between layers 22r and 22r'.

The presence of intermediate layers 22i allows for a delay between discarding the layer represented by arrow 22d, so that a control system of electrophotography-based additive manufacturing system 10 (e.g., controller 36) has time to react and prepare to develop and transfuse reprinted layer 22r' without interrupting or significantly slowing the overall build process.

While FIG. 7 illustrates the discarding of a single layer and compensation with the reprinting of a single reprinted layer 22r', in further embodiments multiple layers could be omitted and a corresponding number, or a different number, of reprinted layers can be present in a given 3D part. Moreover, in alternate embodiments, a "dummy" layer could be developed and transfused that is not identical to any other layers, but is instead either of a default shape or is a modification of another slice/layer (e.g., having a different shape, x-y position, etc.). Additionally, 3D parts 26' and 26" are illustrated as having equal layer thicknesses, though in further embodiments layers could have thicknesses that vary.

Figure 8:
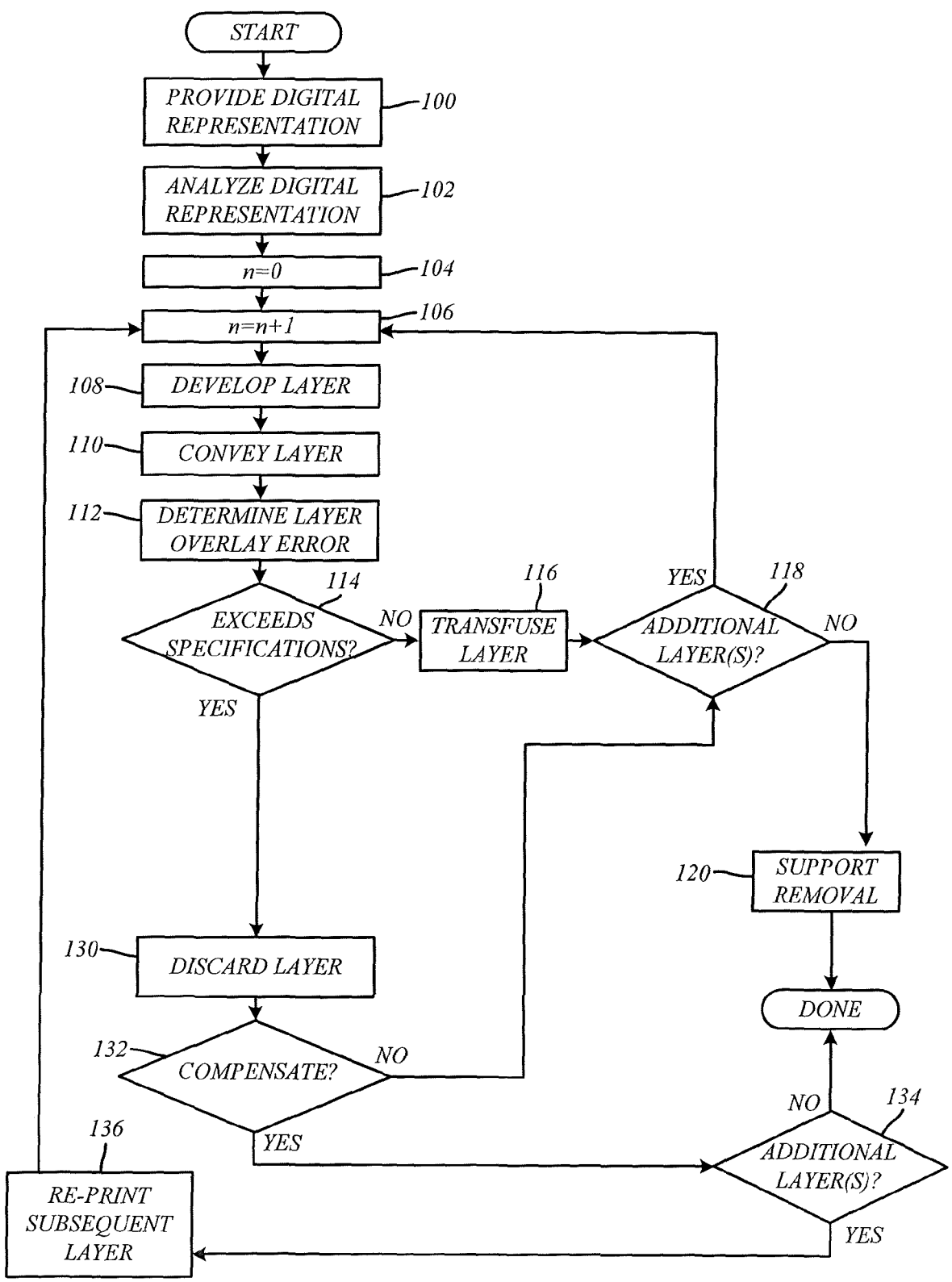
FIG. 8 is flow chart of a method in accordance with embodiments of the present disclosure.

FIG. 8 is flow chart of an example method for building a 3D part 26, 26' or 26". Initially, a digital representation is provided of the 3D part 26, 26' or 26" to be built (step 100). The digital representation can be provided to controller 36 and/or computer 38, such as in the form of one or more AMF or STL format files.

Next, the digital representation is analyzed (step 102). The analysis can include one or more different aspects. The digital representation is sliced into multiple generally horizontal layers than can be developed as corresponding layers 22 by EP engines 12. Locations for development of support structure 26s and fiducial structure 26f can also be devised and suitable build instructions devised. Expected characteristics of layers developed from individual slices can also be established, such as expected arrival times of individual layers for transfusion based on operational characteristics of electrophotography-based additive manufacturing system 10. Additionally, the analysis step 100 can include identifying one or more features of the 3D part 26, 26' or 26" that are at or near a minimum feature size. For example, a minimum feature size can include requirements for x-, y- and/or z-axis dimensions, such as a requirement that all portions of 3D part 26, 26' or 26" have a z-axis thickness of at least a minimum number of layers, such as, for instance, twelve layers. Such minimum feature size limits can help ensure that "bridge" structures that link different portions of 3D part 26, 26' or 26" are buildable and sufficiently structurally sound, for instance. Identification of features at or near (e.g., within a few layer thicknesses) of the minimum feature size can be performed manually by an operator using computer 38, for example, or in an automated fashion using computer 38 and/or controller 36. This information can be stored and later used to ascertain whether discarding one or more layers would cause certain portions of 3D part 26, 26' or 26" to fall below the minimum feature size.

A counter can be initiated, with an initial value n=0 (step 104). The counter is then incremented such that n=n+1 (step 106). The counter can be implemented by controller 36, though in further embodiments the counter can be omitted and considered merely as a conceptual aid when reviewing part building operations.

A layer 22 is then developed (step 108), using one or more EP engines 12, and is conveyed by transfer medium 24 (e.g., a belt) from the EP engine(s) 12 to the transfusion assembly 20 (step 110). At the transfusion assembly 20, an anticipated transfusion overlay error $E_o$ for layer 22 is determined (step 112). If the anticipated transfusion overlay error $E_o$ is zero, that means there is coincidence of layer 22 with a build surface and a previously accumulated layer (at least at leading edges). In one embodiment, the determination can involve making one or more measurements or detections, combined with one or more calculations. For example, a detection can be made with non-contacting (e.g., optical) sensor 96 a small distance before nip roller 70 to detect an arrival time of the leading edge of fiducial portion 22f of layer 22. Velocity and acceleration of transfer medium 24 can also be measured or otherwise ascertained. Based on the detected arrival time, an expected arrival time, and the velocity/acceleration, a temporal arrival time error can be calculated as a difference between the detected and expected arrival times. The arrival time error can be converted to an x-axis (i.e., in-track direction) spatial error using the velocity/acceleration of the transfer medium 24, and/or other relevant and available data. Although the spatial error is calculated based on detection at sensor 96, such calculations indicate the anticipated transfusion overlay error $E_o$ that will occur at a nip of nip roller 70 during transfusion of layer 22 when layer 22 arrives. The relatively short distance separating sensor 96 and the nip of nip roller 70 still allows for a reliable indication of the anticipated transfusion overlay error $E_o$ for layer 22. Knowledge of the anticipated transfusion overlay error $E_o$ allows for adjustments to be made during or before a transfusion operation, such as to move the gantry 84 so as to reposition a build surface of 3D part 26, 26' or 26" before layer 22 is transfused or to adjust the velocity of transfer medium 24, for instance, in a manner disclosed in Baecker et al., U.S. Patent App. Publication No. 2016/0339646. Although the foregoing example discusses overlay errors in the x-axis direction, sensor 96 can also detect and measure data for y-axis overlay errors.

In an alternative embodiment, there is no fiducial portion 22f in layer 22, and instead a fiducial mark can be present on transfer medium 24, in a location with an established spatial relationship to layer 22 when supported on transfer medium 24. Sensor 96 can detect the arrival and/or location of the fiducial mark on transfer medium as a fiducial arrival event and the anticipated transfusion overlay error $E_o$ can be determined in much the same way as described above with respect to fiducial structure 22f.

While adjustments are possible to compensate for the anticipated transfusion overlay error $E_o$ during transfusion, there are limits to such adjustments. Accordingly, after determining the anticipated transfusion overlay error $E_o$, a determination is made as to whether the anticipated transfusion overlay error $E_o$ exceeds a specification (step 114). Such a specification can, for instance, be a range bounded by a minimum threshold and a maximum threshold, each of which can correspond to limits for x- and-or y-axis adjustments during transfusion of layer 22, or can be any other desired set of one or more requirements. In other words, step 114 can involve determining whether the anticipated transfusion overlay error $E_o$ is too large to be fully mitigated by position adjustments during transfusion. It is preferable to have a relatively short time delay between detecting the anticipated transfusion overlay error $E_o$ and the arrival of the leading edge(s) of layer 22 at the nip of nip roller 70, so that other drift sources do not perturb the predicted timing. Such a short delay can be accomplished, in part, through placement of sensor 96. However, the time delay should be sufficiently large to allow for layer discarding steps discussed below.

If the anticipated transfusion overlay error $E_o$ is within specification(s), then layer 22 can be transfused (step 116), and a determination made as to whether there are additional layers 22 to transfuse (step 118). If there are additional layers, the method can return to step 106 to increment the counter and proceed with steps related to the next subsequent layer 22. If there are no additional layers, then removal of support structures 26s (step 120) and/or other finishing steps can be performed to complete the method.

If, on the other hand, the anticipated transfusion overlay error $E_o$ exceeds the specification(s), then layer 22 (or 22d) can be discarded (step 130). Discarding layer 22 (or 22d) can involve moving gantry 84 to avoid transfusion as transfer medium 24 moves layer 22 (or 22d) past (and above) the build surface of the previously accumulated layers, for instance. An embodiment of the discarding step is explained below with reference to FIG. 9.

Next, a determination is made as to whether compensation for the omission of the discarded layer 22 (or 22d) should be performed (step 132). In some embodiments, compensation can always be sought by default. In one embodiment, compensation can involve adding an additional layer to the part. In some embodiments, such a step can involve reprinting a subsequent layer after transfusing a plurality of intermediate layers. However, such compensation by reprinting a subsequent layer requires that a sufficient number of layers remain to be built, that is, the omitted layer 22 (or 22d) must be sufficiently below a top of the 3D part 26". Accordingly, a determination can be made as to whether a sufficient number of additional layers are specified by the digital representation and slices thereof (step 134). If insufficient additional layers are specified by the digital representation, the method can conclude, and, optionally, the part can be rejected. If sufficient additional layers are specified by the digital representation, then instructions to reprint a subsequent layer 22r can be generated (step 136). Alternatively, when there are insufficient additional layers remaining, operation of transfer medium can be slowed or stopped and the discarded layer 22d can be reprinted. Such an alternative approach may be effective because discarded layer is close to a top of 3D part 26", and slowing operation of electrophotography-based additive manufacturing system 10 will have a negligible effect on overall build time, compared to such a slow-down for a layer 22 closer to a bottom of 3D part 26", when a substantial number of developed layers may already be supported on transfer medium 24 and would need to be discarded.

In order to continue operating electrophotography-based additive manufacturing system 10 at a normal rate without a slowdown or the need to discard developed layers on transfer medium 24, a plurality of intermediate layers 22i can be transfused before the reprinted layer 22r'. The number of intermediate layers can be selected as desired for particular applications, based on factors such as processing speed and reaction time of controller 36, the number of developed layers 22 normally supported on transfer medium 24 in between EP engines 12 and transfusion assembly 20, and the like. In one embodiment, at least six intermediate layers 22i are provided. Thus, instructions are generated at step 136, but the method returns to step 106 and the intermediate layers 22i are transfused first, before layer 22r is reprinted. Of course, each intermediate layer 22i is subjected to the same analysis as discarded layer 22d, and could be omitted. However, there is generally no need to account for such additional layer omissions with regard to the reprinting instructions, because the intermediate layers 22i are present to simplify control functions and maintain throughput rate, not for any structural part building reasons. As discussed with respect to FIG. 7, reprinted layer 22r' can be identical, in some embodiments.

In alternative embodiments, instead of reprinting layer 22r, compensation can be made in another way. For instance, a thickness of one or more subsequent layers can be modified to gradually compensate for the omission of discarded layer 22d. As another example, the instructions generated at step 136 can be conditional, and an overall height of 3D part 26' or 26" can be sensed, and the layer 22r reprinted only if the overall height is lower than expected. In instances where build tolerances have resulted in a greater than anticipated overall height, omission of discarded layer 22d without reprinting layer 22r can help compensate for part height deviations.

In general, steps of the method illustrated in FIG. 8 can iterate until 3D part 26, 26' or 26" is fully built, or until building is stopped and the incomplete part rejected.

Figure 9:
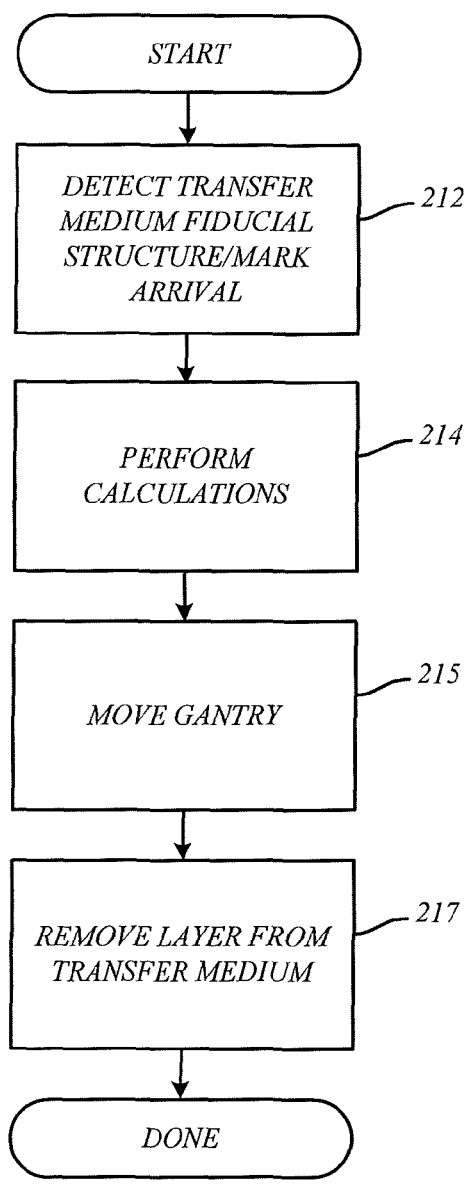
FIG. 9 is another flow chart of an embodiment of a method of discarding an overlay-errant layer according to the present disclosure.

FIG. 9 is a flow chart of an embodiment of a method for discarding an overlay-errant layer. As shown in the illustrated embodiment, arrival of a fiducial structure or mark is detected with sensor 96 as layer 22d is supported on transfer medium approaching the nip of nip roller 70 (step 212). Next, calculations are performed that result in a determination to discard layer 22d (step 214). In one embodiment, gantry 84 is moved so as to lower build platform 28 and accumulated layers of 3D part 26' or 26" prior to the arrival of layer 22d at the nip of nip roller 70, to produce a gap such as, for instance, approximately 100 mils, between layer 22d and the build surface of the accumulated layers of 3D part 26' or 26" (step 215). The resulting gap between layer 22d and the part build surface prevents transfusion of layer 22d. Layer 22d continues to be supported and conveyed by transfer medium 24 past the accumulated layers on build platform 28 until layer 22d arrives at a cleaner 300 (see FIG. 4), where it is removed from transfer medium 24 (and is effectively destroyed).

Although the present disclosure has been described with reference to preferred embodiments, workers skilled in the art will recognize that changes may be made in form and detail without departing from the spirit and scope of the disclosure.

The invention claimed is:

1. A method of operating a selective deposition-based additive manufacturing system capable of building a three-dimensional (3D) part, the method comprising:
    developing a first layer using at least one electrostatographic engine, wherein the first layer comprises at least one of a part material and a support material;
    conveying the first layer from the at least one electrostatographic engine to a transfusion assembly;
    determining an anticipated transfusion overlay error for the first layer;
    determining whether the anticipated transfusion overlay error exceeds an overlay error specification;
    discarding the first layer, after determining that the anticipated transfusion overlay error exceeds the overlay error specification;
    developing a successive layer using the at least one electrostatographic engine, wherein the successive layer comprises at least one of the part material and the support material;
    conveying the successive layer from the at least one electrostatographic engine to the transfusion assembly; and
    transfusing the successive layer on a part build surface using the transfusion assembly to build the 3D part in a layer-by-layer manner on a part build platform;
    analyzing a digital representation of the 3D part to identify at least one feature of the 3D part at or near a minimum feature size, wherein the digital representation includes a plurality of slices corresponding to a plurality of layers of the 3D part, the plurality of layers including the first layer and the successive layer;
    generating instructions to develop and transfuse a subsequent layer more than once, wherein the subsequent layer falls within a non-adjoining window separated from the successive layer in the 3D part by a plurality of intermediate layers; and
    determining whether the step of discarding of the first layer, in combination with the step of generating instructions to develop and transfuse the subsequent layer more than once, would cause the at least one feature of the 3D part at or near the minimum feature size to fall below the minimum feature size.

2. The method of claim 1, wherein the step of determining the anticipated transfusion overlay error for the first layer comprises optically sensing a fiducial arrival event associated with the first layer supported on a transfer medium, and converting a fiducial arrival time error to a spatial error, the fiducial arrival time error determined as a function of the sensed fiducial arrival event and an expected fiducial arrival time.

3. The method of claim 1 and further comprising:
    generating instructions to develop and transfuse a subsequent layer more than once.

4. The method of claim 3, wherein the subsequent layer is separated from the successive layer in the 3D part by the plurality of intermediate layers.

5. The method of claim 4, wherein the plurality of intermediate layers includes at least five layers.

6. The method of claim 1, wherein the overlay error specification accounts for whether the anticipated transfusion overlay error is sufficiently large to be incapable of being mitigated by position adjustments during the transfusion step.

7. The method of claim 1, wherein the overlay error specification includes determining whether the anticipated transfusion overlay error is between a minimum threshold and a maximum threshold to allow for position adjustments during the transfusion step is capable of mitigating the anticipated transfusion overlay error.

8. The method of claim 1, wherein the step of discarding the first layer comprises:
    moving the part build platform to create a gap between the part build surface and the first layer;
    conveying the first layer on a transfer medium past the part build surface; and
    removing the first layer from the transfer medium.

9. A method of operating a selective deposition-based additive manufacturing system to build a three-dimensional (3D) part, the method comprising:
    analyzing a digital representation of the 3D part to identify at least one feature of the 3D part at or near a minimum feature size, wherein the digital representation includes a plurality of slices corresponding to a plurality of layers of the 3D part;
    developing a first layer using at least one electrostatographic engine, wherein the first layer is one of the plurality of layers, and wherein the first layer comprises at least one of a part material and a support material;
    conveying the first layer from the at least one electrostatographic engine to a transfusion assembly;
    determining an anticipated transfusion overlay error for the first layer;
    determining whether the anticipated transfusion overlay error exceeds an overlay error specification;
    determining whether discarding the first layer, in combination with a non-adjoining window to reprint a subsequent layer, would cause the at least one feature of the 3D part at or near the minimum feature size to fall below the minimum feature size;
    retaining the first layer, after determining that the anticipated transfusion overlay error exceeds the overlay error specification but would cause the at least one feature of the 3D part at or near the minimum feature size to fall below the minimum feature size; and
    transfusing the first layer on a part build surface using the transfusion assembly to build the 3D part in a layer-by-layer manner on a part build platform.

10. The method of claim 9, wherein the overlay error specification accounts for whether the anticipated transfusion overlay error is sufficiently large to be incapable of being mitigated by position adjustments during the transfusion step.

11. The method of claim 9, wherein the overlay error specification includes determining whether the anticipated transfusion overlay error is between a minimum threshold and a maximum threshold to allow for position adjustments during the transfusion step is capable of mitigating the anticipated transfusion overlay error.

12. The method of claim 9, wherein the step of determining the anticipated transfusion overlay error for the first layer comprises optically sensing a fiducial arrival event associated with the first layer, and converting an arrival time error to a spatial error, the arrival time error determined as a function of the sensed fiducial arrival event and an expected fiducial arrival time.

13. The method of claim 9, wherein the subsequent layer is separated from the first layer in the 3D part by a plurality of intermediate layers.

14. The method of claim 13, wherein the plurality of intermediate layers includes at least six layers.

15. A method of operating a selective deposition-based additive manufacturing system to build a three-dimensional (3D) part in a layer-by-layer manner, the method comprising:

analyzing a digital representation of the 3D part to identify at least one feature of the 3D part at or near a minimum feature size, wherein the digital representation includes a plurality of slices corresponding to a plurality of layers of the 3D part;

developing a first layer using at least one electrostatographic engine, wherein the first layer is one of the plurality of layers, and wherein the first layer comprises at least one of a part material and a support material;

conveying the first layer from the at least one electrostatographic engine to a transfusion assembly;

determining an anticipated transfusion overlay error for the first layer;

determining whether the anticipated transfusion overlay error exceeds an overlay error specification;

ascertaining whether a non-adjoining window to reprint a subsequent layer exists, wherein the non-adjoining window is separated from an intended position of the first layer in the 3D part by a predetermined number of intermediate layers that are each part of the plurality of layers;

determining whether discarding the first layer, in combination with the non-adjoining window to reprint the subsequent layer, would cause the at least one feature of the 3D part at or near the minimum feature size to fall below the minimum feature size; and ceasing building of the 3D part when either (a) the non-adjoining window to reprint a subsequent layer exists or (b) discarding the first layer would cause the at least one feature of the 3D part at or near the minimum feature size to fall below the minimum feature size.

16. The method of claim 15, wherein the predetermined number of intermediate layers includes at least six layers.

17. The method of claim 15, wherein the overlay error specification accounts for whether the anticipated transfusion overlay error is sufficiently large to be incapable of being mitigated by position adjustments during the transfusion step.

18. The method of claim 15, wherein the overlay error specification includes determining whether the anticipated transfusion overlay error is between a minimum threshold and a maximum threshold to allow for position adjustments during the transfusion step is capable of mitigating the anticipated transfusion overlay error.

* * * * *